United States Patent [19]

Seacord et al.

[11] Patent Number: 5,167,235
[45] Date of Patent: Dec. 1, 1992

[54] FIBER OPTIC EAR THERMOMETER

[75] Inventors: Alan R. Seacord, Descanso; Greg E. Plambeck, San Clememte, both of Calif.

[73] Assignee: Pat O. Daily Revocable Trust, San Diego, Calif.

[21] Appl. No.: 664,294

[22] Filed: Mar. 4, 1991

[51] Int. Cl.$^5$ .............................................. A61B 6/00
[52] U.S. Cl. .................................. 128/664; 128/736; 374/131
[58] Field of Search ............... 128/736, 664; 374/130, 374/131, 132, 121

[56] References Cited

U.S. PATENT DOCUMENTS

| | | | |
|---|---|---|---|
| 3,779,233 | 12/1973 | Saslow et al. | 128/6 |
| 3,878,836 | 4/1975 | Twentier | 128/9 |
| 4,583,526 | 4/1986 | Ali | 128/6 |
| 4,602,642 | 7/1986 | O'Hara et al. | 128/664 |
| 4,662,360 | 5/1987 | O'Hara et al. | 128/664 |
| 4,679,556 | 7/1987 | Lubock et al. | 606/1 |
| 4,784,149 | 12/1988 | Berman et al. | 128/664 |
| 4,800,886 | 1/1989 | Nestor | 128/664 |
| 4,895,164 | 1/1990 | Wood | 128/736 |
| 4,900,162 | 2/1990 | Beckman et al. | 374/132 |
| 4,932,789 | 6/1990 | Egawa et al. | 374/126 |
| 4,986,671 | 1/1991 | Sun et al. | 374/131 |
| 4,993,419 | 2/1991 | Pompei et al. | 128/664 |
| 5,012,813 | 5/1991 | Pompei et al. | 128/664 |
| 5,017,018 | 5/1991 | Iuchi et al. | 374/130 |

Primary Examiner—Stephen C. Pellegrino
Assistant Examiner—Guy V. Tucker
Attorney, Agent, or Firm—Frank D. Gilliam

[57] ABSTRACT

A thermometer for measuring the core temperature of a body by measuring infrared radiation emitted by the tympanic membrane of the ear. The thermometer includes a fiber optic fiber bundle assembly which is inserted into the ear canal to a location adjacent to the tympanic membrane. Infrared radiation is conveyed to a thermopile which converts the radiation to an electrical signal. To assure an accurate signal in changing ambient temperature conditions, circuitry is provided which measures the thermopile resistance (heat) just prior and/or just subsequent to taking a temperature reading and nulling this signal. A disposable sheath is provided to cover the end of the fiber optic assembly inserted into the ear canal to prevent cross contamination between patients. The sheath includes an infrared radiation transparent window over the end of the fiber optic so that there are no openings in the sheath within the ear. Electronic circuitry is provided to measure and display input voltage characteristics, compensate for room temperature variations, fiber optic transmission variations and thermopile cold junction temperature variations, and display an accurate measured temperature. The temperature measured is displayed within about one second of initiation of temperature measurement.

8 Claims, 5 Drawing Sheets

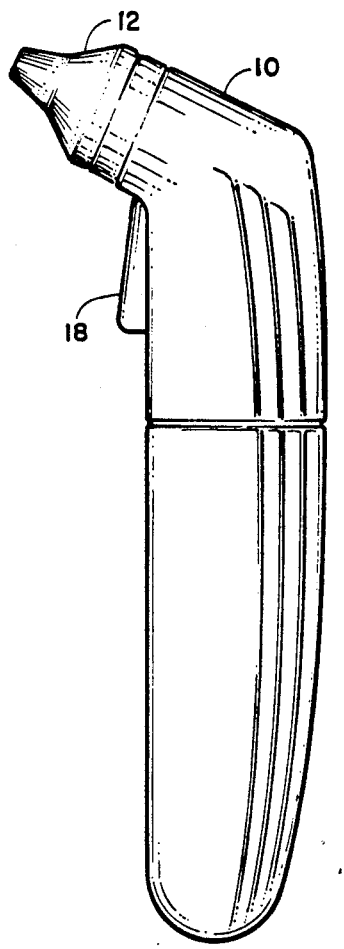
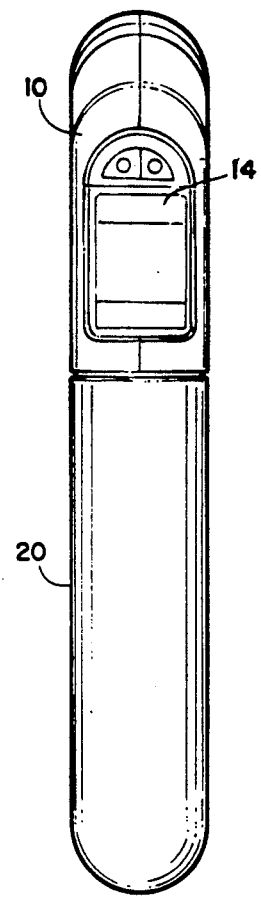
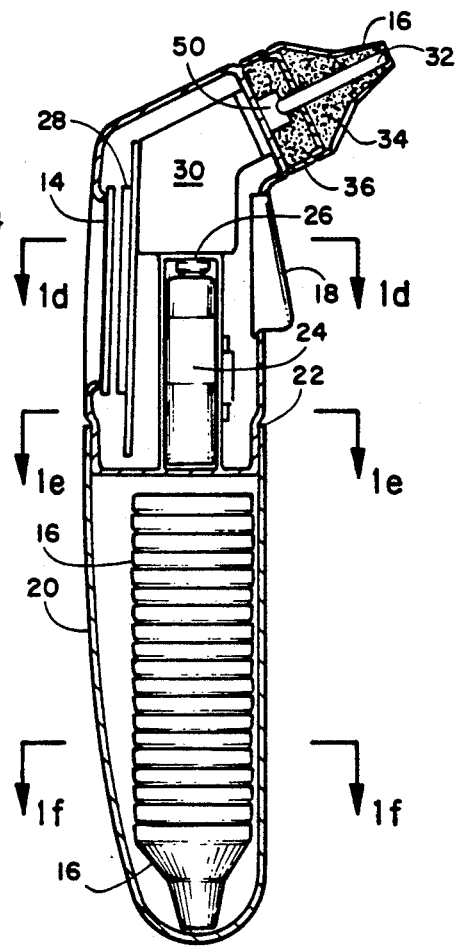
FIGURE 1a  FIGURE 1b  FIGURE 1c
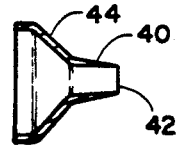
FIGURE 2
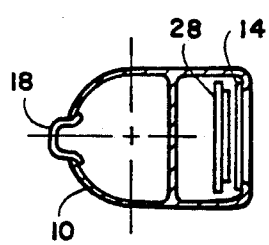
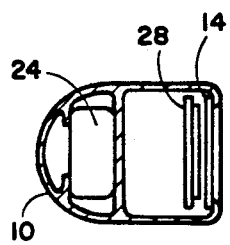
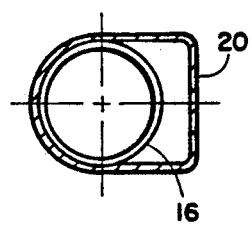
FIGURE 1d  FIGURE 1e  FIGURE 1f

FIBER OPTIC EAR THERMOMETER

BACKGROUND OF THE INVENTION

This invention relates in general to thermometers intended to measure the core temperature of a living being and, more specifically, to measure that temperature by measuring and analyzing infrared radiation from the tympanic membrane.

The measurement of the core temperature of a body has been long used in medical diagnosis and treatment. The most common method has been to measure temperature with a tubular glass thermometer containing mercury by insertion in the mouth or rectum, placing under the arm, etc. Breakage of those thermometers in use is a constant danger. Seriously ill or injured patients may bite through the thermometer or make abrupt movements which cause breakage during the 2-3 minutes required to obtain an accurate maximum temperature. Further, mouth or rectum temperatures may not always be representative of true body core temperature and do not change as rapidly as core temperature. These thermometers require sterilization when used with a number of patients to prevent cross-contamination and must be shaken down to reduce the displayed temperature since they only measure increasing temperature. These steps take significant time in a busy medical office or hospital and may be overlooked with serious consequences.

Considerable effort has been expended in recent years towards improved body temperature measuring devices using electronic probes of one sort or another. Often, the glass thermometer is simply replaced with a metal or plastic housed temperature sensing probe inserted in the mouth or rectum. While somewhat safer than the glass thermometers, these continue to be slow in measuring temperature and do not precisely indicate accurate, up to the minute, body core temperature.

Recently, it has been determined that the tympanic membrane within the ear canal is an excellent site for determination of the core temperature of a body due to its proximity to the external carotid artery which supplies blood to the hypothalamus. The hypothalamus has been shown to be the site of the body's core temperature. Patients show changes in core temperature at the tympanic membrane prior to peripheral sites such as the mouth or rectum. This allows the attending physician to more quickly respond to possible complications.

Prior ear thermometers suffer from a number of problems. They are difficult to calibrate to provide accurate temperatures in varying ambient temperature conditions and have repeatability problems. The previous ear thermometers used rigid metal tube "waveguides" using a metal coating such as gold to increase the reflectivity of the inner surface. Since these work according to principles of classic optics with the infrared radiation bouncing off the walls from one end to the other there are severe losses with a tube of the necessary length. For example, assuming a reflectivity of 97%, 20 "bounces" will reduce the signal by about 50%. The tube must be straight and must have a large diameter to reduce the number of bounces. Typical of such ear thermometers is that described by Fraden in U.S. Pat. No. 4,797,840.

Another prior ear thermometer is described by O'-Hara et al in U.S. Pat. No. 4,790,324. This thermometer uses a probe including waveguide tube to direct infrared radiation to a thermopile which is kept at a constant temperature by a heater. In order to calibrate the unit, before use the probe is connected to a chopper unit which is kept at a constant temperature by a second heater system to establish a reference temperature. Then the probe is removed from the chopper, a disposable speculum is placed over the probe which is then inserted in the patient's ear and a temperature reading is taken. This complex calibration method is prone to errors, requires several heaters and may give erroneous readings if the calibration targets are not at the precise intended temperatures or there is a delay between calibration and ear temperature measurement.

Thus, there is a continuing need for improved ear thermometers of improved simplicity, accuracy and usefulness.

SUMMARY OF THE INVENTION

It is, therefore, an object of this invention to provide an ear thermometer overcoming the above-noted problems.

Another object of this invention is to provide an improved, low-loss, means for conveying infrared radiation from the tympanic membrane to a temperature detector.

Still another object is to provide an ear thermometer of improved accuracy and resistance to errors resulting from varying ambient conditions.

A further object is to provide an ear thermometer capable of accurate compensation or nulling of extraneous signals immediately prior or immediately after temperature measurement.

Yet another object is to provide an improved disposable sheath for the probe of an ear thermometer.

The above objects, and others, are accomplished in accordance with this invention, basically, by an ear thermometer which includes a probe for insertion into the ear to a location adjacent to, but not in contact with, the tympanic membrane, an infrared radiation transmitting flexible fiber optic light guide within the probe for transmitting infrared radiation emitted by the tympanic membrane to a thermopile in an adjacent housing, a disposable sheath over the probe having an infrared transparent window portion covering the fiber optic end, electronic circuitry in the housing to compensate for ambient temperature variations, detector drift, etc. and provide an accurate temperature readout and a display for indicating the temperature measured.

The unit may have any suitable configuration. In general, a "pistol grip" shape has been found to be convenient, with the electronic components and batteries in the handle. The flexible fiber optic light guide allows placement of the detector in the body of the handpiece to allow better thermal and electrical shielding of the detector. The fibers have a small numerical aperture so they look at only the tympanic membrane and do not transmit radiation from surrounding ear tissue. Since the fiber optic has very low transmission losses, a longer transmission path may be used and a smaller detector may be used for lower noise.

This ear thermometer is a self-contained, battery powered unit. If rechargeable batteries are used, the unit may be stored between uses in a recharger stand which may have an attached container for a supply of disposable probe sheaths. The unit is easily portable, typically being carried in a small case with a supply of sheaths.

BRIEF DESCRIPTION OF THE DRAWING

Details of the invention, and of preferred embodiments thereof, will be further understood upon reference to the drawing, wherein:

FIG. 1a is a side elevation view of the ear thermometer of this invention;

FIG. 1b is a rear elevation view of the ear thermometer of this invention;

FIG. 1c is a schematic section view taken substantially on line 1c—1c in FIG. 1b;

FIG. 1d is a schematic section view taken substantially on line 1d—1d in FIG. 1c;

FIG. 1e is a schematic section view taken substantially on line 1e—1e in FIG. 1c;

FIG. 1f is a schematic section view taken substantially on line 1f—1f in FIG. 1c;

FIG. 2 is an axial section view through the disposable sheath for the probe;

DETAILED DESCRIPTION OF PREFERRED EMBODIMENTS

Figure 3:
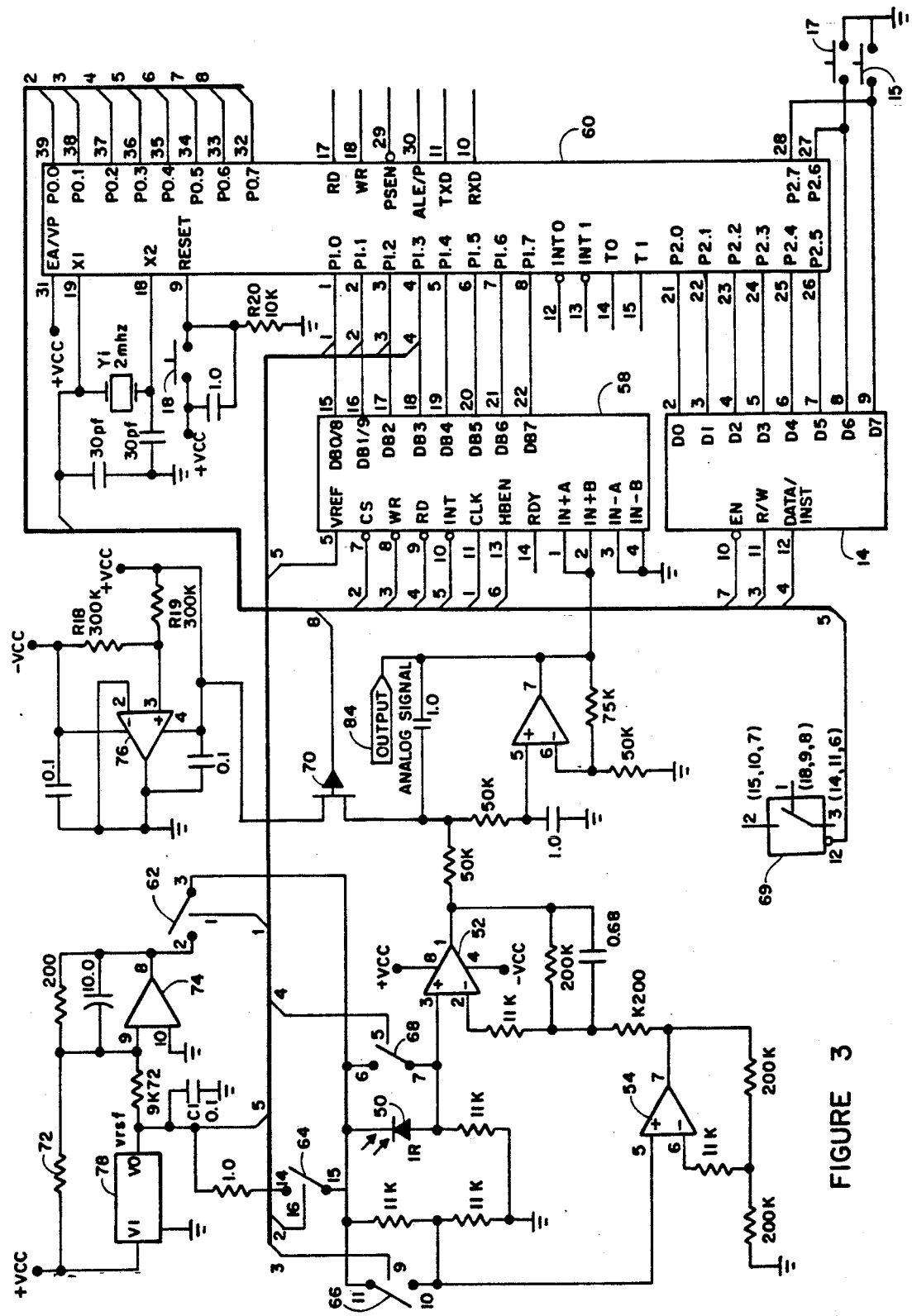
FIG. 3 is an overall schematic circuit diagram of the electronic components.

Referring now to FIGS. 1a and 1b, there are seen front and side elevation views of an ear thermometer according to this invention. A housing 10 contains the electronic and other components and bears a probe 12 and a temperature readout display 14. Display 14 is typically a conventional liquid crystal display. The temperature is displayed in relatively large characters on either the celsius or fahrenheit scales. Display 14 also typically shows the mode, typically oral, rectal, tympanic or scan, "ready" to indicate that the system is ready for use, "calibrate" during the (very short) system calibration cycle and power supply status (typically "recharge" when a rechargeable battery requires recharging prior to use and a bar scale indicating the extent of charge from empty to full). Thus the display 14 provides system status under the direction of a microprocessor. Other system characteristics may be displayed, if desired. Alternatively, a single display line, capable of showing 8 characters, may be used to selectively or in sequence display the "ready", "calibrate", etc., displays, if desired.

While housing may have any suitable configuration, the "pistol" shape shown is preferred for ease of use. The user's hand surrounds the lower portion of housing 10, leaving display area 14 visible, and probe 12 is inserted into the ear canal. A disposable sheath 16 shown in FIG. 2 covers the end of probe 12 and is shaped to permit the desired insertion distance so that the end of probe 12 is near, but not in contact, with the tympanic membrane.

A trigger switch 18 is pressed to begin the temperature calibration and measurement sequence. A pair of mode switches 15 and 17 that allow the operator to toggle from one mode to another are located above display 14. The central area of display 14, the area below switches 15 and 17 in FIG. 1b, is shown in enlarged detail in FIG. 6. When the unit is turned on the unit defaults to the "tympanic" mode. Depressing switch 17 a single time when in the tympanic mode causes the device to change to the scan mode, showing the temperature adjacent to the detector. Pressing switch 17 twice when in the tympanic mode changes to the oral mode, while pressing switch an additional time moves to the rectal mode. The scan, oral and rectal displays are simply equivalents that one would expect to correspond to the tympanic reading obtained. These are for the convenience of clinicians who normally use the oral or rectal method of thermometry.

Figure 6:
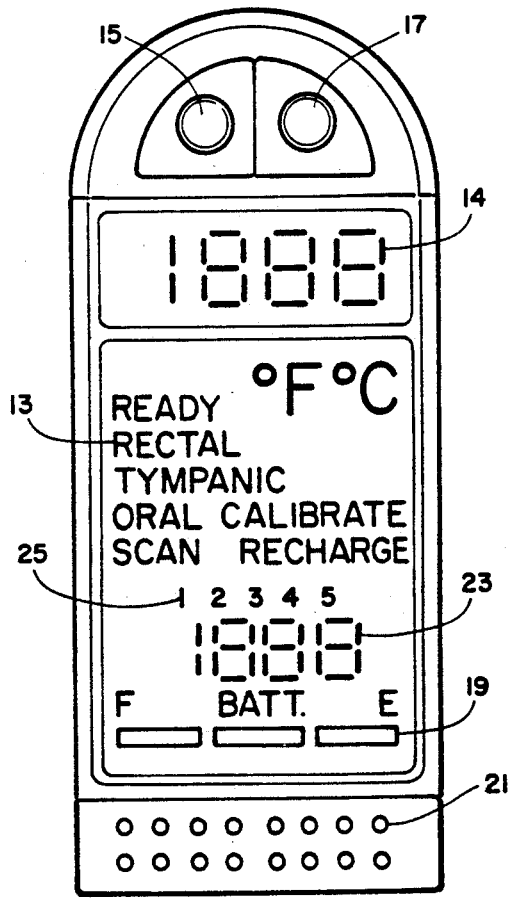
FIG. 6 is an enlarged view of the central area of the output display of FIG. 1b.

The mode in use is shown in area 13 in FIG. 6, as are displays indicating that the calibration sequence is in progress, that the battery is being recharged and the unit is on and "ready". While all of these indicia are shown together in FIG. 6, if liquid crystal display means are used, only the active one of these display words will be shown at a time.

Pressing switch 15 twice changes the reading from Fahrenheit to Celsius and lights the "°C." instead of the "°F." on the display as shown. To recall the last five temperature readings, switch 15 is pressed once, then switch 17 is pressed once. The last five temperature readings are stepped through by pressing switch 15 repeatedly and displayed at area 23. Which of the last five readings is displayed is indicated by numbers 25 (only one of which is displayed at a time). Pressing trigger switch 18 returns to the default settings and displays the last reading taken.

The display also preferably includes a conventional bar shaped liquid crystal display 19 connected to battery 24 so as to indicate battery condition, from fully discharged to fully charged by increasing bar length. Also, an audible alarm 21 (as seen in FIG. 1b) is preferably included to signal very low battery condition with suitable conventional connections to battery 24.

The internal structure of the ear thermometer is schematically illustrated in FIGS. 1c-1f. The lower portion 20 of housing 12 is detachable at connection 22 which may be any suitable arrangement, such as an overlapping friction fit, including conventional ball-and-detent means, if desired. A plurality of stacked sheaths 16 are contained in lower portion 20 for easy removal and installation over probe 12. After each ear temperature measurement the sheath 16 over probe 12 is slipped off and disposed of and a new sheath from housing 20 is installed.

The upper portion of housing 10 contains a power supply 24, typically a rechargeable battery having recharging contacts 26 accessible through a pair of openings or the like in housing 10. Liquid crystal display panel 14 is preferably backed with a conventional display back light 28. The space within housing 10 above the battery and display houses the various electronic components in space 30.

Probe 12 contains optical fiber bundle 32 surrounded by insulation 34 and a disposable sheath 16. If desired, insulation 34 may be eliminated. Thermopile detector 50 as detailed below is located at the inner end of fiber optics 32. If desired, detector 50 may be located in space 30 and optical fibers 32 maybe be curved or bent between the end of probe 12 and the detector.

A stripper collet 36 is preferably located around housing 12 adjacent to sheath 16. Collet is movable a short distance toward sheath 16, to "pop" the sheath off of the housing into a disposal container without requiring the operator to touch the possibly contaminated sheath after use. Installation of a new sheath 16 will return collet 36 to the position shown in FIG. 1c. If desired, an extension may be provided above the upper end of trigger (which is hinged at the upper end as seen in FIG. 1c) extending upwardly and forwardly into contact with collet 36, to move collet 36 forwardly, so that a sheath is pushed off every time trigger 18 is fully pressed in.

Any suitable optical fibers may be used. Excellent results are obtained with chalcogenide glass fibers of the sort available from Infrared Fiber Systems, Inc. Fibers typically have diameters of from about 120 to 440 microns and are used in bundles encased in a plastic sheath. Since the optical fiber length in our unit is rather short, the usable infrared bandwidth should be about 2 to 12 microns. The fiber bundle may have any suitable diameter, preferably in the 0.090 to 0.115 inch range. Since the fiber bundle is thin, external ambient temperature will have little adverse effect on the fibers. If desired, a thin layer of conventional polyethylene foam insulation may be provided to further reduce any outside temperature effects.

Because the fiber optic bundle is flexible, the thermopile may be placed in the optimum location in housing 10, with maximum isolation from outside temperature variations, with the fiber bundle curved between probe 12 and the thermopile in space 30.

Details of the disposable sheath 16 are provided in axial section in FIG. 2. The internal configuration of sheath 16 is configured to conform to the outer surface of probe 12. The length of tip portion 40 is selected to be sufficient to allow the end 42 to be inserted into the ear canal to a position adjacent to and spaced from the tympanic membrane while the generally conical wall 44 prevents insertion so far as to allow end 42 to contact the tympanic membrane. While the bulk of sheath 16 has sufficient thickness for ease of handling, the window at end 42 should be very thin, on the order of 0.002 to 0.004 inch thick, to avoid any significant absorption of infrared radiation passing therethrough. Sheath 16 is made from any suitable material having low infrared radiation absorption characteristics, such as polyethylene. Sheath 16 is made by injection molding using a mold that has a movable mandrel or piston adjacent to the window end 42. When molten plastic is injected into the mold, the piston is slightly moved away from the opposite wall of the mold in the window area, allowing the plastic to flow easily into that area. Then, prior to cooling and solidification of the plastic, the piston is moved toward the opposite mold wall, compressing and forcing plastic out of that area until the window end 42 has a thickness of about 0.001 to 0.002 inch. This method permits rapid production of uniformly high quality sheaths while producing an infrared transmitting window of uniform thickness and high clarity so that the maximum quantity of infrared radiation from the tympanic membrane passes to the optical fiber.

The electronic circuitry for calibrating the ear thermometer and reading tympanic temperature is schematically illustrated in FIG. 3. A thermopile detector 50, typically a model 2m Detector available from Dexter Research Center, Inc., accepts an infrared input signal from the optical fiber (not shown) within probe 12. Detector 50 transduces the heat signal to an electrical signal which is amplified by amplifiers 52 and 54, typically each an OP221 from Linear Technology, Inc.. Because of the differential connection, amplifiers 52 and 54 provide very good thermal stability of the input amplifier and increase the signal-to-noise ratio. Amplifier 56 (typically an LP324 from Linear Technology) provides low-pass filtering and boostering for analog-to-digital converter 58, typically an AD7579 from Analog Devices, Inc. Converter 58 converts the analog signal to digital code and sends it to microprocessor 60, typically a 65512 U5 from Oki Technology, Inc.

In accordance with installed software, microprocessor 60 controls switches 62, 64, 66, and 68 for receiving information from detector 50, checks the power supply by turning on switch 70, accepts power supply voltage via switch 70 and amplifier 56, receives ambient temperature information from the independent transducer or resistor 72, typically an AD590 from International Components, and amplifier 74, typically another LP324. Final information is sent to display 14. Switches 62–68 are simplified schematic parts of mode switch 69 (which includes both switches 15 and 17 as seen in FIG. 1b), typically an ADG221 from Analog Devices.

Amplifier 76, typically another LP324, splits voltage from the single power supply, typically from a rechargeable battery, to bipolar voltage, indicated as −VCC and +VCC. Voltage reference 78, typically an AD580 from International Components, provides stable voltage for converter 58 and for temperature transduction.

In this schematic, each chip performs several functions. Typically, amplifiers 52 and 54 are parts of a single OP221 and measure input signal, thermopile detector 50 resistance, null offsetting and amplify the signal from resistor 72. Amplifiers 56, 74 and 76 may be parts of a single LP324 which is used for converting ambient temperature (amplifier 74), splitting voltage (amplifier 76) and low pass filtering and checking battery voltage (amplifier 56). With this arrangement, only 5 main chips are required.

Three manually operable switches are provided to control system functions. Trigger switch 18 resets the system and initiates another temperature reading. Mode switch 17 changes the mode from tympanic, scan, oral and rectal modes as described above. Switch 15 when open causes the display to default to a temperature reading on the Fahrenheit scale and when closed changes the display to Celsius.

The output signal from a thermopile detector 50 depends not only on the input signal from the temperature source (here the tympanic membrane) but also on the detector's own internal temperature. Thus, room temperature fluctuations will cause drift and inaccuracy in the measurement. In the past, attempts were made to overcome this problem by placing the thermopile in a metal housing and attempting to maintain that housing at a constant temperature with a heater/cooler under control of a thermocouple in contact with the thermopile. Unfortunately, the temperature of the thermocouple does not exactly equal the temperature of the detector and this arrangement requires additional circuitry and power. Since the resistance of the detector depends on its temperature, we measure the resistance of the thermopile in the circuit of FIG. 3 to determine the precise thermopile temperature, i.e., the thermopile acts as its own thermometer. This resistance is used to compensate the measured signal to obtain an accurate, drift-free reading.

In a thermopile detector 50, the thermopile consists of many thermocouples connected together. Each thermocouple consists of a "hot" (signal) junction and a "cold" (reference) junction. The measured voltage is given by the difference between these junctions. However, the input temperature signal affects not only the hot junction of the thermopile but because of its very small size and thermoconductivity the input signal also changes the temperature of the cold junction. Different input temperatures will cause different changes in the temperature of the cold junction. In the past, a calibration source, typically a reference source or chopper controller, approximately equal to the expected temperature signal (e.g. 98° F. for a thermometer to be used with humans) was used. However, the input temperature signal can vary over a relatively large range and the calibration error will increase in proportion to the difference between the temperature of the reference and the unknown source (the patient's tympanic membrane). To overcome this problem, our microprocessor 60 performs the calibration immediately after the measurement. The temperatures of the thermopile hot and cold junctions stabilize during measurement. Upon completion of the measurement, the microprocessor interrupts the incoming signal, so that the output of the thermopile should be zero. Any actual signal is a result of cold junction error and is deleted from the measured signal by the microprocessor to produce a precisely accurate temperature signal.

The system operates in several hardware modes, depending upon the positions of switches 62, 64, 66 and 68 as controlled by microprocessor 60. FIGS. 4a through 4f illustrate these different switch arrangements and the resulting functions in simplified schematic circuit form.

Figure 4A:
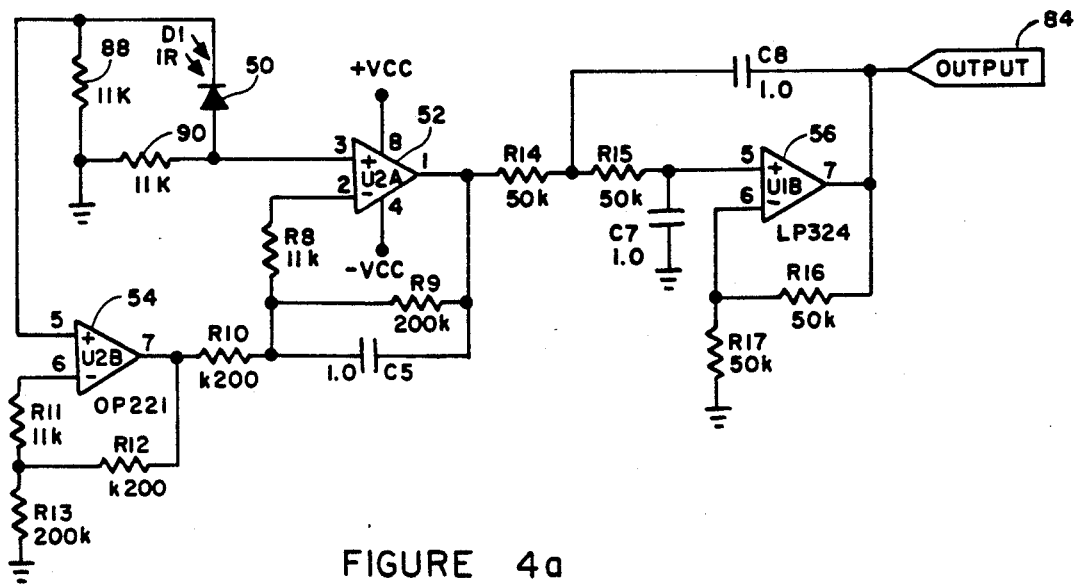
FIG. 4a is a detail schematic circuit diagram illustrating the measurement of the input signal.

FIG. 4a shows the simplified circuit configuration during measurement of the input signal from thermopile detector 50. Switches 62, 64 and 68 are turned off while switch 66 is turned on. An analog signal corresponding to the input signal is passed to analog to digital converter 58 (not seen in FIG. 4a) through output 84. This analog portion of the circuit operates as a differential amplifier with gain of about 2000.

Figure 4B:
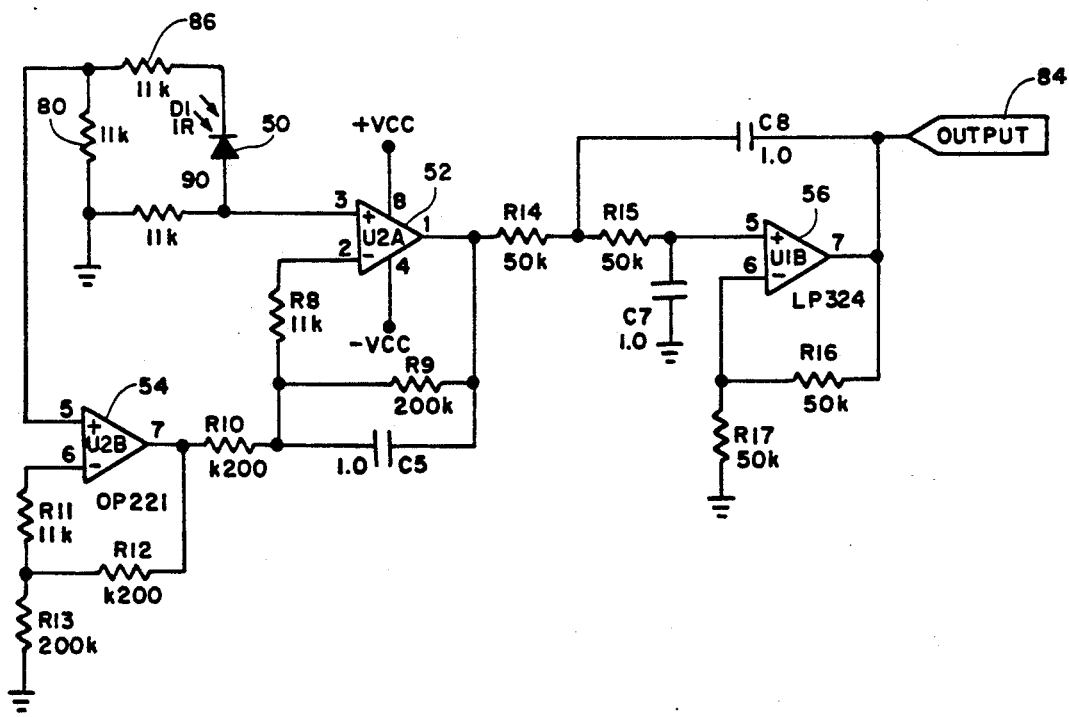
FIG. 4b is a detail schematic circuit diagram illustrating the measurement of the signal from the thermopile detector.

FIG. 4b shows the simplified circuit configuration during another measurement of the signal from the thermopile detector 50. However, in this case switches 62, 64, 66 and 68 are all turned off, which adds resistor 86 to the circuit so that the conditions of signal measurement have been changed. By alternately measuring the detector signal with the circuits shown in FIGS. 4a and 4b, better accuracy and stability are obtained.

Figure 4C:
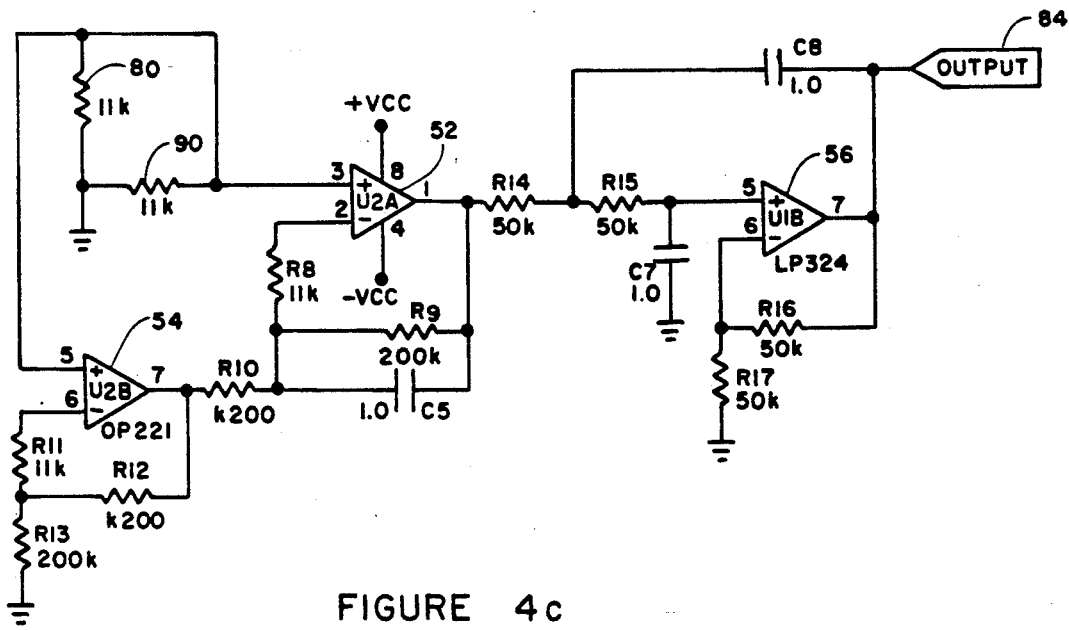
FIG. 4c is a detail schematic circuit diagram illustrating null-offset trimming.

The technique for null-offset trimming is illustrated in the simplified circuit shown in FIG. 4c. Here, switches 62 and 64 are turned off and switches 66 and 68 are turned on. In this case the thermopile detector 50 output signal (differential amplifier 58 input) is equal for both inputs from amplifiers 52 and 54, so the output should be zero. Therefore, any output voltage is totally error (thermodrift of input voltage and current, errors generated by contact thermopotentials, by electro-magnetic fields, etc.) so that this signal should be subtracted from the main signal, which was received in the circuit arrangement of FIG. 4a. Thus, corrections are rapidly and accurately made for these errors as microprocessor 60 goes through the programmed operation sequence.

Figure 4D:
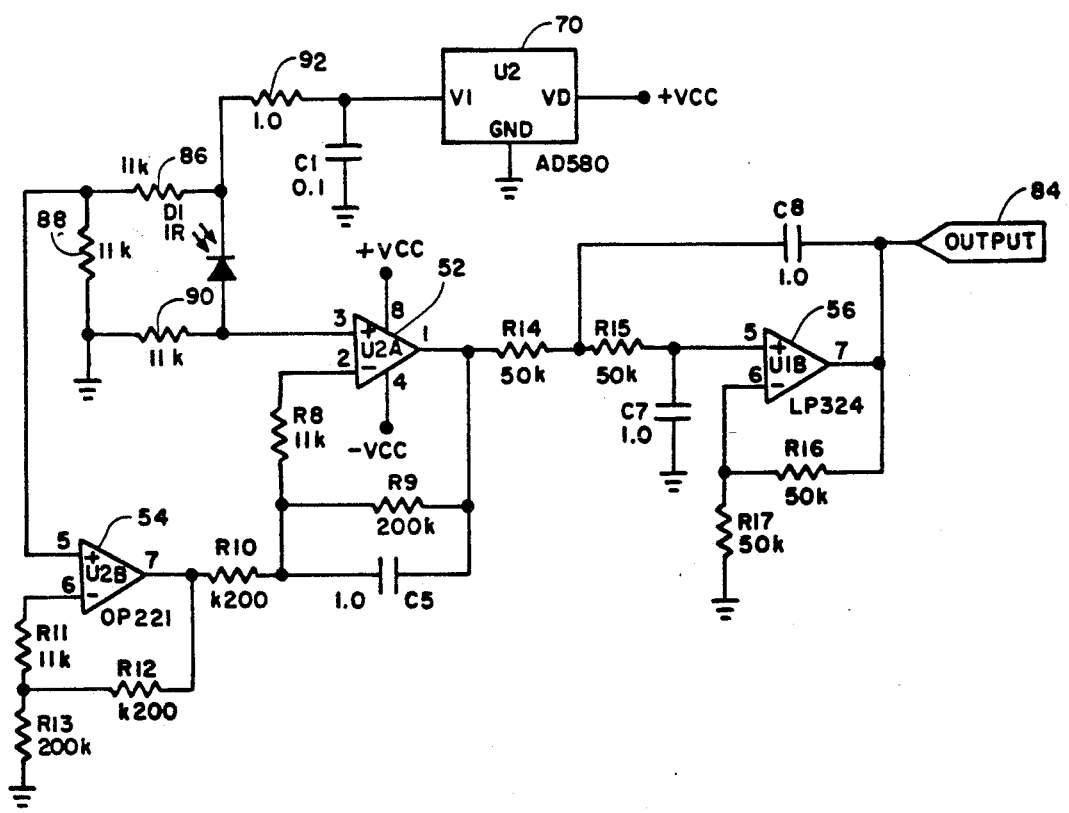
FIG. 4d is a detail schematic circuit diagram illustrating the measurement of the resistance of the thermopile detector.

The simplified circuit shown in FIG. 4d measures resistance of the thermopile detector 50 to provide information about the actual thermopile temperature. In this case switches 62, 66 and 68 are turned off and switch 64 is turned on by microprocessor 60. A resistor bridge which is supplied by electric current through resistor 92 has three known values, resistors 86, 88 and 90. Changes in resistance in this bridge are proportional to temperature changes in detector 50. Because of the high system gain it is possible to determine detector 50 temperatures on the order of 0.05° C. Thus, errors resulting from changes in thermopile temperature can be easily compensated for by microprocessor 60.

Figure 4E:
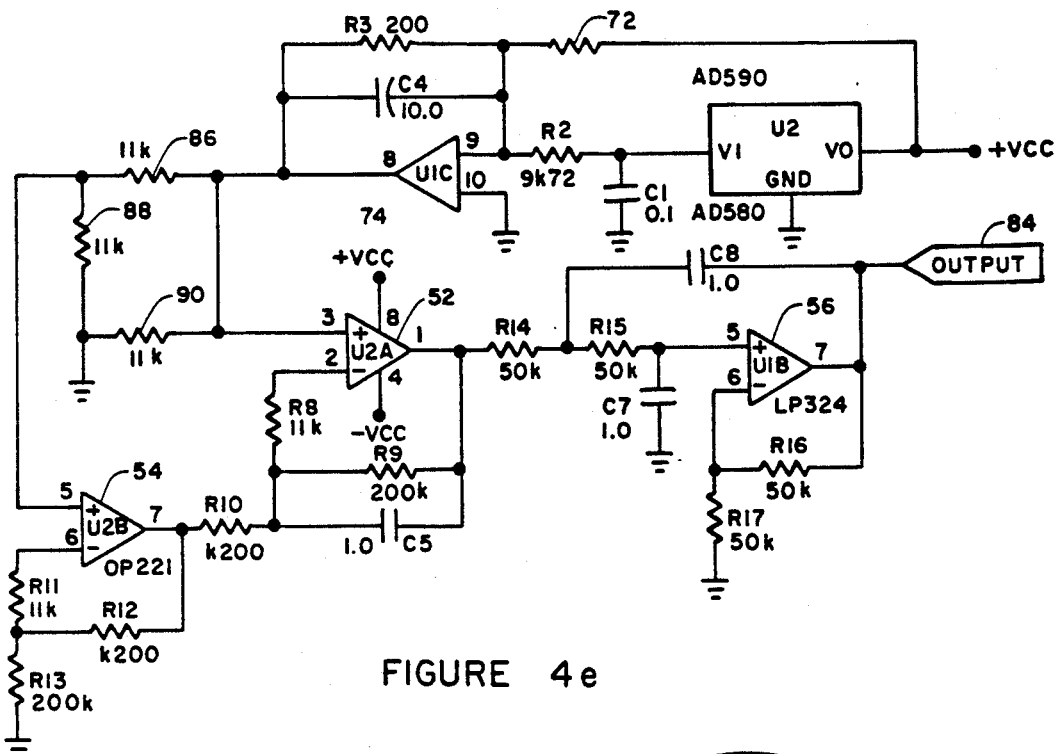
FIG. 4e is a detail schematic circuit diagram illustrating the measurement of ambient temperature.

FIG. 4e illustrates the simplified circuit configuration for measuring ambient temperature from an independent transducer. This allows the ear thermometer to be checked against industry standards over a wide range of temperatures. In this case, switches 62 and 66 are turned off and switches 64 and 68 are turned on. The temperature transducer, resistor 72 is connected through amplifier 74 (which converts ° F. to ° C.) is connected to the differential amplifier input. The output will correspond to 100mv/1° C. Comparison to standard temperature sources is accomplished by a conventional calibration heater.

Figure 5:
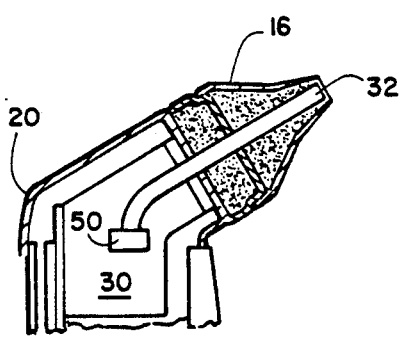
FIG. 5 is a detail section view corresponding to the upper portion of FIG. 1c, illustrating an alternative fiber optic arrangement.

FIG. 5 is a detail section view, corresponding to the upper portion of the embodiment shown in FIG. 1c. Here, fiber optic 32 is curved and detector 50 is placed further back in housing 20, partially within container 30. As discussed above, with the fiber optic system of this invention it is not necessary that the light guide be absolutely straight, since our fiber optics are fully effective when curved.

While certain preferred components, materials, arrangements and configurations were detailed in the above description of preferred embodiments, those may be varied, where suitable, with similar results. Other variations, applications and ramifications of this invention will occur to those skilled in the art upon reading this disclosure. Those are intended to be included within the scope of this invention, as defined in the appended claims.

We claim:

1. An ear thermometer for measuring body core temperature through infrared radiation from the tympanic membrane which comprises:
    a probe adapted to be inserted into the ear canal;
    said probe containing an infrared transmitting optical fiber assembly having a first end positioned adjacent to the tympanic membrane when said probe is located in an ear canal;
    a disposable sheath surrounding the probe and isolating said probe from contact with the ear canal;
    said sheath including a thin infrared transmitting window formed as part of said sheath and positioned over said first optical fiber end;
    a housing adjacent to said probe and receiving the second end of said optical fiber;
    a thermopile detector adjacent to said second end of said optical fiber and positioned to receive radiation emitted by said second end and for generating an electrical signal corresponding to said radiation;
    electrical circuit means for calibrating said signal and compensating for ambient temperature and detector temperature fluctuations and producing an output electrical signal accurately indicative of tympanic membrane temperature;

said electrical circuit means for calibrating said signal including means for measuring the resistance of said thermopile detector to determine the precise present temperature of said detector and means to compensate for variations in said temperature to provide an accurate, drift free, detector output voltage;

said electrical circuit means for calibrating said signal being capable of calibrating said thermopile detector immediately after taking a temperature measurement to assure an accurate temperature measurement;

said electrical circuit means for calibrating said signal comprising:

said thermopile detector;

thermally stable amplifier means for amplifying the output signal from said thermopile detector;

an analog to digital converter for receiving a signal from said amplifier means and for producing a corresponding digital signal; and a microprocessor for receiving said digital signal and controlling calibration of the system and production of an accurate signal corresponding to the temperature measured and for sending said digital signal to said display means;

said microprocessor controlling a plurality of switches for selectively measuring an input signal, measuring the signal from said thermopile detector, correcting for system errors including thermodrift of the input voltage and current, errors generated by contact thermopotentials and electro-magnetic fields, measuring resistance of the thermopile detector and correcting for thermopile temperature errors, measuring ambient temperature and correcting for errors caused by variations thereof, and measuring voltage from the power supply and indicating insufficiency thereof; and display means for displaying indicia representing the output signal according to a selected temperature scale.

2. The ear thermometer according to claim 1 wherein said optical fiber assembly comprises fibers formed form chalcogenide glasses.

3. The ear thermometer according to claim 1 wherein said optical fiber assembly is flexible and is curved between said probe and said thermopile within said housing.

4. The ear thermometer according to claim 1 wherein said display is a liquid crystal display means capable of selectively displaying temperature on celsius or fahrenheit scales, and displaying power supply status and system status.

5. The ear thermometer according to claim 4 where said display means includes means for selectively displaying the tympanic temperature measured and that temperature converted to equivalent oral or rectal temperatures.

6. The ear thermometer according to claim 4 wherein said display means includes bar shaped liquid crystal display means for displaying battery condition between fully discharged and fully charged in accordance with displayed bar length.

7. The ear thermometer according to claim 4 wherein said display means includes audible alarm means for indicating low battery charge conditions.

8. The ear thermometer according to claim 1 further including a slidable collet means in contact with an in place sheath and means for moving said collet toward said sheath to eject said sheath without requiring an operator to touch said sheath.

* * * * *